US012752233B2

(12) United States Patent
Dolan et al.

(10) Patent No.: US 12,752,233 B2
(45) Date of Patent: Oct. 6, 2026

(54) ADSORBENT BED WITH INCREASED HYDROTHERMAL STABILITY

(71) Applicant: BASF Corporation, Florham Park, NJ (US)

(72) Inventors: William B. Dolan, Iselin, NJ (US); Margaret Anne Greene, Iselin, NJ (US); Justin Pan, Iselin, NJ (US); Tobias Eckardt, Nienburg/Weser (DE); Joerg Nagy, Nienburg/Weser (DE); Robert Lepski, Nienburg/Weser (DE)

(73) Assignee: BASF CORPORATION, FLorham Park, NJ (US)

( * ) Notice: Subject to any disclaimer, the term of this patent is extended or adjusted under 35 U.S.C. 154(b) by 301 days.

(21) Appl. No.: 18/283,360

(22) PCT Filed: Apr. 1, 2022

(86) PCT No.: PCT/US2022/023047
§ 371 (c)(1),
(2) Date: Sep. 21, 2023

(87) PCT Pub. No.: WO2022/212841
PCT Pub. Date: Oct. 6, 2022

(65) Prior Publication Data

US 2024/0050886 A1 Feb. 15, 2024

Related U.S. Application Data

(60) Provisional application No. 63/170,157, filed on Apr. 2, 2021.

(51) Int. Cl.
*B01D 53/02* (2006.01)
*B01D 53/04* (2006.01)
*B01D 53/26* (2006.01)

(52) U.S. Cl.
CPC ....... *B01D 53/0423* (2013.01); *B01D 53/261* (2013.01); *B01D 2253/106* (2013.01);
(Continued)

(58) Field of Classification Search
CPC ........ B01D 2253/106; B01D 2253/108; B01D 2256/245; B01D 2257/304;
(Continued)

(56) References Cited

U.S. PATENT DOCUMENTS 4,534,775 A * 8/1985 Frazier .................. B01D 53/02 95/92
4,604,110 A * 8/1986 Frazier .................. F24F 1/0071 55/471
(Continued)

FOREIGN PATENT DOCUMENTS

CA 2726383 C 8/2015
CN 104190352 A 12/2014
(Continued)

OTHER PUBLICATIONS

Berg, et al., "Temperature swing adsorption in natural gas processing: a concise overview", ChemBioEng Reviews, vol. 6, Issue 3, Apr. 17, 2019, pp. 59-71.
(Continued)

*Primary Examiner* — Christopher P Jones
(74) *Attorney, Agent, or Firm* — Peter T. DiMauro

(57) ABSTRACT

Disclosed in certain embodiments are methods of removing water, mercaptans, C5+ or C6+ hydrocarbons, or any combination thereof from a gas feed stream during an adsorption step of an adsorption cycle.

14 Claims, 11 Drawing Sheets

(52) U.S. Cl.
CPC .. *B01D 2253/108* (2013.01); *B01D 2257/306* (2013.01); *B01D 2257/7022* (2013.01); *B01D 2257/7027* (2013.01); *B01D 2257/80* (2013.01); *B01D 2259/4146* (2013.01); *B01D 2259/4148* (2013.01)

(58) Field of Classification Search
CPC ...... B01D 2257/306; B01D 2257/7022; B01D 2257/7027; B01D 2257/80; B01D 2259/4146; B01D 2259/4148; B01D 53/0423; B01D 53/0462; B01D 53/261
See application file for complete search history.

(56) References Cited

U.S. PATENT DOCUMENTS

| | | | | |
|---|---|---|---|---|
| 5,746,788 | A * | 5/1998 | Schmidt | B01D 53/04 95/143 |
| 5,759,236 | A * | 6/1998 | Bruck | B01J 20/3483 95/143 |
| 5,914,455 | A | 6/1999 | Jain et al. | |
| 6,110,258 | A | 8/2000 | Fraenkel et al. | |
| 6,660,240 | B1 | 12/2003 | Toshihiko et al. | |
| 12,083,471 | B2 * | 9/2024 | Dolan | B01J 20/18 |
| 2001/0009125 | A1 | 7/2001 | Monereau et al. | |
| 2005/0121393 | A1 * | 6/2005 | Galbraith | B01D 53/02 210/243 |
| 2007/0006732 | A1 | 1/2007 | Mitariten | |
| 2007/0028770 | A1 * | 2/2007 | Tyndall | B01D 53/22 95/116 |
| 2007/0028773 | A1 * | 2/2007 | Jain | B01D 53/02 95/135 |
| 2007/0031302 | A1 * | 2/2007 | Wittrup | B01D 53/04 422/168 |
| 2009/0320679 | A1 * | 12/2009 | Baksh | B01D 53/0462 96/112 |
| 2012/0024157 | A1 | 2/2012 | Maheshwary et al. | |
| 2013/0291723 | A1 | 11/2013 | Zhou et al. | |
| 2014/0345320 | A1 | 11/2014 | Xuan et al. | |
| 2015/0290575 | A1 | 10/2015 | Rothermel et al. | |
| 2016/0187057 | A1 | 6/2016 | Meyer | |
| 2019/0184329 | A1 | 6/2019 | Sharma et al. | |
| 2019/0299153 | A1 | 10/2019 | Doong et al. | |
| 2021/0339187 | A1 | 11/2021 | Dolan et al. | |
| 2024/0050886 | A1 * | 2/2024 | Dolan | B01D 53/0423 |
| 2025/0360490 | A1 * | 11/2025 | Kitanaka | B01J 20/28016 |

FOREIGN PATENT DOCUMENTS

| | | | |
|---|---|---|---|
| CN | 105381686 | A | 3/2016 |
| CN | 106102865 | A | 11/2016 |
| CN | 110139699 | A | 8/2019 |
| WO | 2020/255302 | A1 | 12/2020 |
| WO | 2021/263216 | A1 | 12/2021 |

OTHER PUBLICATIONS

European Search Report for EP Patent Application No. 22782292.1, Issued on Sep. 15, 2025, 5 pages.

Partial European Search Report for EP Patent Application No. 22782292.1, Issued on Mar. 25, 2025, 4 pages.

International Search Report and Written Opinion of International Application No. PCT/US2022/023047 mailed Aug. 15, 2022, 12 pgs.

"Silica gel", Wikipedia, 1988 [retrieved from the internet on May 25, 2022 at <https://en.wikipedia.org/wiki/Silica_gel>], paragraph 1, 7 pgs.

* cited by examiner

ADSORBENT BED WITH INCREASED HYDROTHERMAL STABILITY

CROSS-REFERENCE TO RELATED APPLICATION(S)

This application claims the benefit of priority of U.S. Provisional Patent Application No. 63/170,157, filed on Apr. 2, 2021, the disclosure of which is hereby incorporated herein in its entirety.

BACKGROUND

Dehydration of natural gas to cryogenic specifications is critical in the pretreatment process for liquified natural gas (LNG) production. Zeolitic molecular sieves are used in such processes because they allow for the natural gas to meet the required dewpoint for liquefaction. Failure to reach this required dewpoint may result in the inability to maintain the necessary gas flow to the liquefaction section, which can constrain or shutdown the production of LNG.

Hydrothermal damage and retrograde condensation in dehydrator vessels during regeneration and adsorption lead to degradation of the molecular sieve adsorbent through leaching of the clay binder and loss of adsorption capacity. In addition, the presence of mercaptans may lead to the formation of $H_2S$ under the process conditions, which may also have a deleterious effect on the molecular sieve. Each of these may result in an increase in pressure drop and an uneven distribution of adsorption and/or regeneration flow, ultimately requiring premature replacement of the adsorbent.

SUMMARY

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect, a method of removing water from a gas feed stream during an adsorption step of an adsorption cycle comprises: directing the gas feed stream having an initial water mole fraction toward one or more adsorbent beds of one or more adsorber units, the one or more adsorbent beds comprising: a first adsorbent layer to remove water from the gas feed stream, the first adsorbent layer comprising a water stable adsorbent; a second adsorbent layer downstream from the first adsorbent layer to remove additional water, the second adsorbent layer comprising a microporous adsorbent; and a third adsorbent layer downstream from the second adsorbent layer, the third adsorbent layer comprising one or more zeolites. In at least one embodiment, the gas feed stream has a reduced water mole fraction when the gas feed stream reaches the third adsorbent layer that is maintained for at least 90% of the duration of the adsorption step. In at least one embodiment, the reduced water mole fraction is no more than about 90% of the initial water mole fraction.

In at least one embodiment, the reduced water mole fraction is no more than about 90%, no more than about 80%, no more than about 70%, no more than about 60%, no more than about 50%, no more than about 40%, no more than about 30%, no more than about 20%, no more than about 10%, no more than about 9%, no more than about 8%, no more than about 7%, no more than about 6%, no more than about 5%, no more than about 4%, no more than about 3%, no more than about 2%, no more than about 1%, no more than about 0.1%, no more than about 0.01%, or no more than about 0.001% of the initial water mole fraction. In at least one embodiment, the reduced water mole fraction is no more than about 20% of the initial water mole fraction.

In at least one embodiment, the reduced water mole fraction is maintained for at least 95%, at least 96%, at least 97%, at least 98%, at least 99%, or 100% of the duration of the adsorption step. In at least one embodiment, the reduced water mole fraction is maintained for 100% of the duration of the adsorption step.

In at least one embodiment, the reduced water mole fraction is no more than about 500 ppm, no more than about 450 ppm, no more than about 400 ppm, no more than about 350 ppm, no more than about 300 ppm, no more than about 250 ppm, no more than about 200 ppm, no more than about 150 ppm, no more than about 100 ppm, no more than about 50 ppm, no more than about 40 ppm, no more than about 30 ppm, no more than about 20 ppm, no more than about 10 ppm, no more than about 5 ppm, or nor more than about 1 ppm.

In at least one embodiment, the reduced water mole fraction is no more than about 100 ppm, no more than about 50 ppm, no more than about 10 ppm, no more than about 9 ppm, no more than about 8 ppm, no more than about 7 ppm, no more than about 6 ppm, no more than about 5 ppm, no more than about 4 ppm, no more than about 3 ppm, no more than about 2 ppm, no more than about 1 ppm, no more than about 0.1 ppm, or no more than about 0.01 ppm.

In another aspect, a method of removing mercaptans from a gas feed stream during an adsorption step of an adsorption cycle comprises: directing the gas feed stream having an initial mercaptan mole fraction toward one or more adsorbent beds of one or more adsorber units, the one or more adsorbent beds comprising: a first adsorbent layer to remove mercaptans from the gas feed stream, the first adsorbent layer comprising a water stable adsorbent; a second adsorbent layer downstream from the first adsorbent layer to remove additional mercaptans, the second adsorbent layer comprising a microporous adsorbent; and a third adsorbent layer downstream from the second adsorbent layer, the third adsorbent layer comprising one or more zeolites. In at least one embodiment, the gas feed stream has a reduced mercaptan mole fraction when the gas feed stream reaches the third adsorbent layer that is maintained for at least 90% of the duration of the adsorption step. In at least one embodiment, the reduced mercaptan mole fraction is no more than about 90% of the initial mercaptan mole fraction.

In at least one embodiment, the reduced mercaptan mole fraction is no more than about 90%, no more than about 80%, no more than about 70%, no more than about 60%, no more than about 50%, no more than about 40%, no more than about 30%, no more than about 20%, no more than about 10%, no more than about 9%, no more than about 8%, no more than about 7%, no more than about 6%, no more than about 5%, no more than about 4%, no more than about 3%, no more than about 2%, or no more than about 1%, no more than about 0.1%, or no more than about 0.01% of the initial mercaptan mole fraction.

In at least one embodiment, the reduced mercaptan mole fraction prior to reaching the third adsorbent layer that is no more than about 500 ppm, no more than about 450 ppm, no more than about 400 ppm, no more than about 350 ppm, no more than about 300 ppm, no more than about 250 ppm, no more than about 200 ppm, no more than about 150 ppm, no more than about 100 ppm, no more than about 50 ppm, no more than about 40 ppm, no more than about 30 ppm, no more than about 20 ppm, no more than about 10 ppm, or no more than about 5 ppm, or no more than about 1 ppm.

In another aspect, a method of removing C5+ or C6+ hydrocarbons from a gas feed stream during an adsorption step of an adsorption cycle comprises: directing the gas feed stream having an initial mole fraction of the C5+ or C6+ hydrocarbons toward one or more adsorbent beds of one or more adsorber units, the one or more adsorbent beds comprising: a first adsorbent layer to remove C5+ or C6+ hydrocarbons from the gas feed stream, the first adsorbent layer comprising a water stable adsorbent; a second adsorbent layer downstream from the first adsorbent layer to remove additional C5+ or C6+ hydrocarbons, the second adsorbent layer comprising a microporous adsorbent; and a third adsorbent layer downstream from the second adsorbent layer, the third adsorbent layer comprising one or more zeolites or an additional microporous adsorbent. In at least one embodiment, the C5+ or C6+ compounds comprise one or more of pentane, hexane, benzene, heptane, octane, nonane, toluene, ethylbenzene, xylene, or neopentane. In at least one embodiment, the gas feed stream has a reduced mole fraction of aromatics and/or aliphatic C8+ or C9+ hydrocarbons when the gas feed stream reaches the third adsorbent layer that is maintained for at least 90% of the duration of the adsorption step. In at least one embodiment, the reduced mole fraction is no more than about 90% of the initial mole fraction.

In at least one embodiment, the reduced mole fraction is no more than about 90%, no more than about 80%, no more than about 70%, no more than about 60%, no more than about 50%, no more than about 40%, no more than about 30%, no more than about 20%, no more than about 10%, no more than about 9%, no more than about 8%, no more than about 7%, no more than about 6%, no more than about 5%, no more than about 4%, no more than about 3%, no more than about 2%, or no more than about 1% of the initial mole fraction.

In at least one embodiment, the reduced mole fraction prior to reaching the third adsorbent layer that is no more than about 500 ppm, no more than about 450 ppm, no more than about 400 ppm, no more than about 350 ppm, no more than about 300 ppm, no more than about 250 ppm, no more than about 200 ppm, no more than about 150 ppm, no more than about 100 ppm, no more than about 50 ppm, no more than about 40 ppm, no more than about 30 ppm, no more than about 20 ppm, no more than about 10 ppm, no more than about 5 ppm, or no more than about 1 ppm.

In at least one embodiment, the one or more adsorbent beds further comprise: a fourth adsorbent layer downstream from the first adsorbent layer and upstream from the second adsorbent layer. In at least one embodiment, the fourth adsorbent layer comprises one or more of an amorphous silica adsorbent, an amorphous silica-alumina adsorbent, or a high-silica zeolite adsorbent. In at least one embodiment, the third adsorbent layer comprises the high-silica zeolite adsorbent. In at least one embodiment, the high-silica zeolite adsorbent comprises ZSM-5, zeolite Y, or beta zeolite.

In another aspect, a method of treating a gas feed stream comprises: directing the gas feed stream having an initial water mole fraction toward one or more adsorbent beds of one or more adsorber units, the one or more adsorbent beds comprising: a first adsorbent layer to remove water from the gas feed stream, the first adsorbent layer comprising a water stable adsorbent; a second adsorbent layer downstream from the first adsorbent layer comprising a microporous adsorbent. In at least one embodiment, the gas feed stream has a reduced water mole fraction when the gas feed stream exits the second adsorbent layer.

In at least one embodiment, the reduced water mole fraction is below a cryogenic maximum for liquid natural gas (LNG) or natural gas liquid (NGL) production.

In at least one embodiment, the one or more adsorbent beds further comprise: a third adsorbent layer downstream from the first adsorbent layer and upstream from the second adsorbent layer. In at least one embodiment, the third adsorbent layer comprises one or more of an amorphous silica adsorbent, an amorphous silica-alumina adsorbent, or a high-silica zeolite adsorbent. In at least one embodiment, the third adsorbent layer comprises the high-silica zeolite adsorbent. In at least one embodiment, the high-silica zeolite adsorbent comprises ZSM-5, zeolite Y, or beta zeolite.

In at least one embodiment, the one or more zeolites of any of the preceding embodiments comprise one or more of zeolite 3A, zeolite 4A, or zeolite 5A.

In at least one embodiment, the one or more zeolites of any of the preceding embodiments comprise one or more of zeolite 5A or zeolite X.

In at least one embodiment, the one or more zeolites of any of the preceding embodiments comprise zeolite 13X.

In at least one embodiment, the one or more zeolites of any of the preceding embodiments comprise zeolite 4A.

In at least one embodiment, one or more zeolites of the preceding embodiments is exchanged with an element selected from Li, Na, K, Mg, Ca, Sr, or Ba.

In at least one embodiment, the water stable adsorbent of any of the preceding embodiments comprises an amorphous silica adsorbent or an amorphous silica-alumina adsorbent.

In at least one embodiment, the gas feed stream of any of the preceding embodiments is a natural gas feed stream.

In at least one embodiment, a water mole fraction of the gas feed stream after contacting the one or more adsorbent beds is below 1 ppm or below 0.1 ppm.

In at least one embodiment, a mercaptan mole fraction of the gas feed stream after contacting one or more of the adsorbent beds is below 10 ppm or below 1 ppm.

In at least one embodiment, a C5+ or C6+ mole fraction of the gas feed stream after contacting one or more of the adsorbent beds is below 10 ppm or below 1 ppm.

In at least one embodiment, the third adsorbent layer of any of the preceding embodiments is in a separate adsorbent bed from the first and second adsorbent layers.

In at least one embodiment, the method of any of the preceding embodiments further comprises: forming a liquefied natural gas product from the gas feed stream after contacting the second adsorbent layer.

In at least one embodiment, the method of any of the preceding embodiments further comprises: forming a C2+ or C3+ natural gas liquid feed stream from the gas feed stream after contacting the second adsorbent layer.

In at least one embodiment, the contacting of any of the preceding embodiments is performed as part of a thermal swing adsorption process having a cycle time of no more than about 8 hours, no more than about 7 hours, no more than about 6 hours, no more than about 5 hours, no more than about 4 hours, no more than about 3 hours, no more than about 2 hours, or no more than about 1 hour.

In at least one embodiment, the gas feed stream of any of the preceding embodiments further comprises non-mercaptan hydrocarbons. In at least one embodiment, one or more components of non-mercaptan hydrocarbons in the gas feed stream is reduced by 100%, 90%, 80%, 70%, 60%, 50%, 40%, 30%, 20%, 10%, or 5% on a molar basis relative to an initial concentration of that component in the gas feed stream prior to reaching the second adsorbent layer. In at least one embodiment, the one or more components are selected from benzene, C9 hydrocarbons, C8 hydrocarbons, C7 hydrocarbons, or C6 hydrocarbons.

In at least one embodiment, the method of any of the preceding embodiments further comprises: prior to directing the gas feed stream toward the adsorbent bed, retrofitting the adsorbent bed by removing and replacing at least a portion of a previously present adsorbent with one or more of the first adsorbent layer or the second adsorbent layer.

In another aspect, one or more adsorbent units adapted for removing one or more of water, mercaptans, or heavy hydrocarbons from a gas feed stream comprise at least one adsorbent bed of any of the preceding embodiments.

In another aspect, a natural gas purification system comprises at least one adsorbent bed of any of the preceding embodiments.

BRIEF DESCRIPTION OF THE DRAWINGS

The present disclosure is illustrated by way of example, and not by way of limitation, in the figures of the accompanying drawings, in which.

DETAILED DESCRIPTION

Figure 1A:
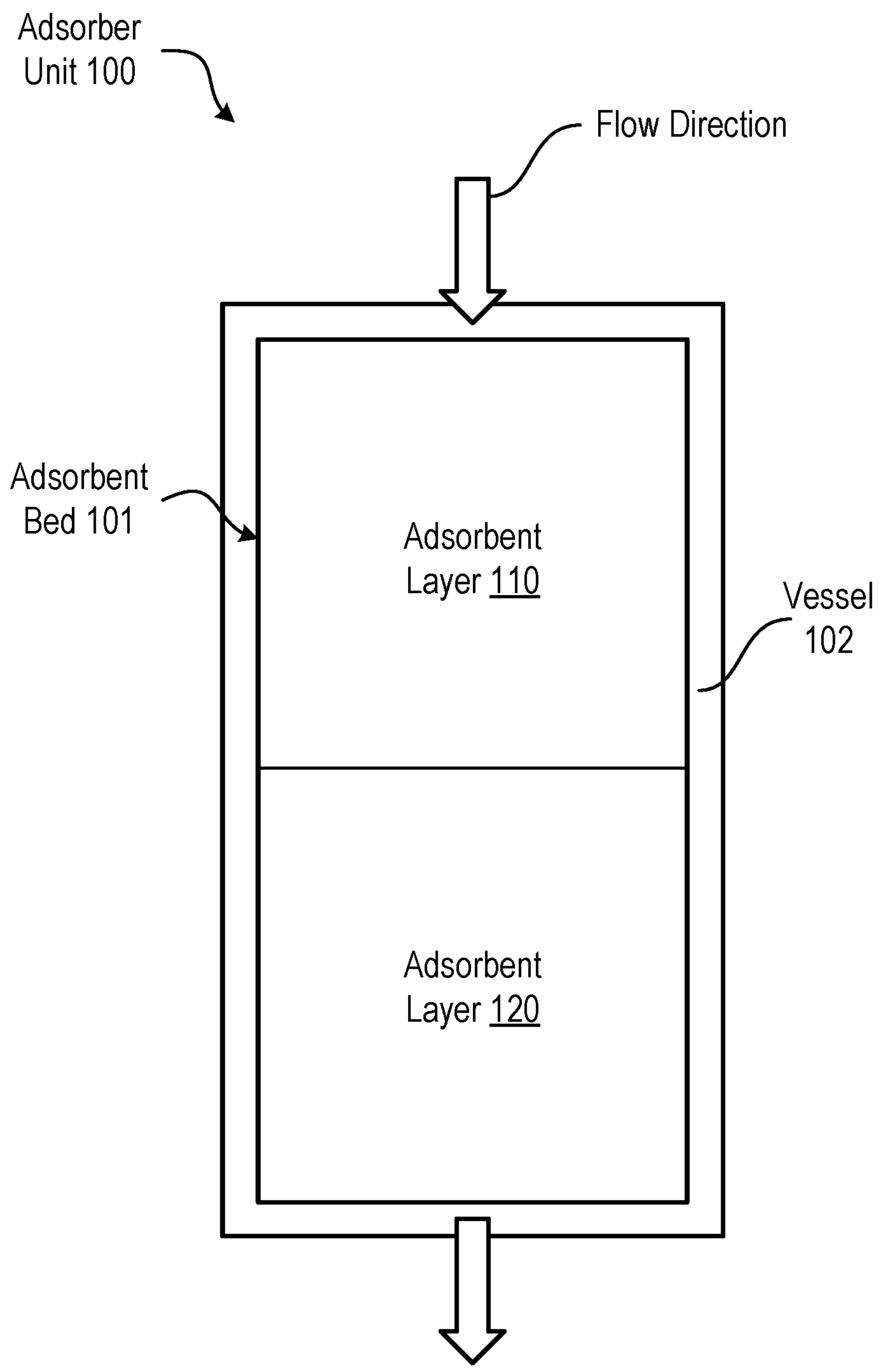
FIG. 1A illustrates an adsorber unit in accordance with an embodiment of the disclosure.

The present disclosure relates generally to methods of removing water, mercaptans, heavy hydrocarbons (such as C5+ or C6+ hydrocarbons), or any combination thereof from a gas feed stream comprising hydrocarbons and water during an adsorption step of an adsorption cycle, as well as to adsorbent beds adapted for the same. Some embodiments relate to a single adsorbent bed for removing hydrocarbons (e.g., mercaptans as well as heavy hydrocarbons, such as C5+ or C6+ hydrocarbons) and/or water down to cryogenic specifications for producing liquefied natural gas (LNG), rather than utilizing two or more separate adsorbent beds. Other embodiments relate to the use of multiple adsorbent beds for performing the same.

In general, molecular sieves, such as zeolite 3A and zeolite 4A, are often used to dry natural gas feed streams. Although these materials beneficially remove water from natural gas at the conditions of the operating units (i.e., high pressure methane and high water concentration), they are subject to hydrothermal damage. While there are other mechanisms that can damage the sieves (e.g., refluxing) which may be mitigated, hydrothermal damage appears unavoidable. Silica-based materials have been shown to be highly robust in this application with practical field experience where the adsorbent has lasted more than ten years in comparable environments; however, these materials are generally not used to remove water to cryogenic specifications required for forming liquefied natural gas.

Some embodiments described herein advantageously utilize an amorphous silica adsorbent, an amorphous silica-alumina adsorbent, a high-silica zeolite adsorbent (e.g., beta zeolite, ZSM-5, high-silica Y zeolite, etc.), a microporous adsorbent, or combinations thereof, in combination with a less hydrothermally stable adsorbent (e.g., zeolite 3A or zeolite 4A) as separate adsorbent layers to produce a robust, longer-lasting adsorbent system. In such embodiments, the mole fractions of water entering the section of the adsorbent bed containing the less hydrothermally stable adsorbent is reduced by the upstream layer of the adsorbent bed. Since there is a lower mole fraction of water entering the less hydrothermally stable adsorbent during the adsorption step, there is also less water to desorb during the regeneration step and hence a lower steaming environment is created during regeneration. This is advantageous as it is known to those skilled in the art that a steaming environment can damage zeolites. Moreover, mole fractions of heavy hydrocarbons (e.g., pentane, hexane, benzene, heptane, octane, nonane, toluene, ethylbenzene, xylene, neopentane, etc.) and/or mercaptans (which can form $H_2S$) are also reduced by the upstream layer of the adsorbent bed. Without wishing to be bound by theory, it is believed that reducing the formation of $H_2S$ can reduce damage to the less stable adsorbent (e.g., by coke deposition, sulfur deposition, or acidic degradation). While the layers may be arranged within one or multiple beds (i.e., within separate vessels), some embodiments can further advantageously allow for hydrocarbon adsorption (including mercaptans and C5+ or C6+ hydrocarbons) and water adsorption to be performed in a single adsorbent bed while being able to reduce the water mole fraction below a cryogenic maximum. This reduces the total number of units needed, thus reducing the physical size of the natural gas processing facility.

The adsorption process of the present disclosure, used to remove mercaptans, heavy hydrocarbons (e.g., C5+ or C6+ components), water, or any combination thereof from gas feed streams (e.g., a natural gas feed streams), may be accomplished by thermal swing adsorption (TSA). TSA processes are generally known in the art for various types of adsorptive separations. Generally, TSA processes utilize the process steps of adsorption at a low temperature, regeneration at an elevated temperature with a hot purge gas, and a subsequent cooling down to the adsorption temperature. TSA processes are often used for drying gases and liquids and for purification where trace impurities are to be removed. TSA processes are often employed when the components to be adsorbed are strongly adsorbed on the adsorbent, and thus heat is required for regeneration.

A typical TSA process includes adsorption cycles and regeneration (desorption) cycles, each of which may include multiple adsorption steps and regeneration steps, as well as cooling steps and heating steps. The regeneration temperature is higher than the adsorption temperature in order to effect desorption of water, mercaptans, heavy hydrocarbons, or any combination thereof. To illustrate, during the first adsorption step, which employs an adsorbent for the adsorption of mercaptans from a gas stream (e.g., a raw natural gas feed stream), the temperature is maintained at less than 150° F. (66° C.) in some embodiments, and from about 60° F. (16° C.) to about 120° F. (49° C.) in other embodiments. In the regeneration step of the present disclosure, water and mercaptans adsorbed in the adsorbent bed initially are released from the adsorbent bed, thus regenerating the adsorbent at temperatures from about 300° F. (149° C.) to about 550° F. (288° C.) in some embodiments.

In the regeneration step, part of one of the gas streams (e.g., a stream of natural gas), the product effluent from the adsorption unit, or a waste stream from a downstream process can be heated, and the heated stream is circulated through the adsorbent to desorb the adsorbed components. In some embodiments, it is advantageous to employ a hot purge stream comprising a heated raw natural gas stream for regeneration of the adsorbent.

In some embodiments, the pressures used during the adsorption and regeneration steps are generally elevated at typically 700 to 1500 psig. Typically, heavy hydrocarbon adsorption is carried out at pressures close to that of the feed stream and the regeneration steps may be conducted at about the adsorption pressure or at a reduced pressure. When a portion of an adsorption effluent stream is used as a purge gas, the regeneration may be advantageously conducted at about the adsorption pressure, especially when the waste or purge stream is re-introduced into the raw natural gas stream, for example.

As used herein, a "mercaptan" refers to an organic sulfur-containing compound including, but not limited to, methyl mercaptans (C1-RSH), ethyl mercaptans (C2-RSH), propyl mercaptans (C3-RSH), butyl mercaptans (C4-RSH), dimethyl sulfide (DMS), and dimethyl disulfide (DMDS).

While embodiments of the present disclosure are described with respect to natural gas purification processes, it is to be understood by those of ordinary skill in the art that the embodiments herein may be utilized in or adapted for use in other types of industrial applications that require mercaptans and/or water removal in addition to LGN and natural gas liquid (NGL) applications.

FIG. 1A illustrates an adsorber unit 100 in accordance with an embodiment of the disclosure, which may be adapted for use in a TSA process. In some embodiments, the adsorber unit 100 includes a single vessel 102 that houses an adsorbent bed 101. Other embodiments may utilize multiple vessels and adsorbent beds, for example, when implementing a continuous TSA process where one or more adsorbent beds are subject to an adsorption cycle while one or more beds are subject to a regeneration cycle. For example, the adsorber unit 100 may include, in some embodiments, two or more vessels and adsorbent beds that are duplicates of the vessel 102 and the adsorbent bed 101 (not shown). While the adsorbent bed 101 is subjected to an adsorption cycle, a duplicate adsorbent bed is subjected to a regeneration cycle, for example, using a product gas resulting from the adsorption cycle performed with the adsorbent bed 101.

The adsorbent bed 101 includes an adsorbent layer 110 and an adsorbent layer 120 each contained inside a vessel 102. The flow direction indicates the flow of a gas feed stream through an inlet of the vessel 102, through the adsorbent layer 110, and then through the adsorbent layer 120, before reaching an outlet of the vessel 102. The adsorbent layer 120 is said to be downstream from the adsorbent layer 110 based on this flow direction. In some embodiments, each adsorbent layer may comprise their respective adsorbents in a form of adsorbent beads having diameters, for example, from about 1 mm to about 5 mm. The relative sizes of the adsorbent layers is not necessarily drawn to scale, though in certain embodiments a weight percent (wt. %) of the adsorbent layer 110 with respect to a total weight of the adsorbent bed 101 (i.e., a total weight of the adsorbent layer 110 and any additional layers) may be greater than 50 wt. %, greater than 60 wt. %, greater than 70 wt. %, greater than 80 wt. %, or greater than 90 wt. %.

In some embodiments, the adsorbent layer 110 comprises a water stable adsorbent, such as Durasorb™ HD (available from BASF), comprising, for example, silica or silica-alumina.

In some embodiments, the adsorbent layer 120 comprises an adsorbent that is preferentially selective for mercaptans. In some embodiments, the adsorbent layer 120 comprises an adsorbent that is preferentially selective for C5+ or C6+ hydrocarbons. As used herein, the terms "preferentially selective for" or "selective for" indicates that the adsorbent adsorbs the specified compound at a greater equilibrium loading compared to methane, further described by the following equation: selectivity=(loading C6+/concentration C6+)/(loading C1/concentration C1), where C1 is methane, and where loading is defined as moles of component adsorbed per gram of adsorbent. In certain embodiments, C5+ or C6+ compounds may comprise one or more of pentane, hexane, benzene, heptane, octane, nonane, toluene, ethylbenzene, xylene, or neopentane.

In some embodiments, the adsorbent layer 120 comprises one or more of an amorphous silica adsorbent, an amorphous silica-alumina adsorbent, or a high-silica zeolite adsorbent. In some embodiments, the adsorbent layer 120 comprises an amorphous silica adsorbent and/or an amorphous silica-alumina adsorbent. Amorphous silica adsorbents and amorphous silica-alumina adsorbents may be at least partially crystalline. In some embodiments, an amorphous silica adsorbent or an amorphous silica-alumina adsorbent may be at least 50% amorphous, at least 60% amorphous, at least 70% amorphous, at least 80% amorphous, at least 90% amorphous, or 100% amorphous. In some embodiments, an amorphous silica adsorbent or an amorphous silica-alumina adsorbent may further include other components, such as adsorbed cations. An exemplary adsorbent for use in the adsorbent layer 120 may be Durasorb™ HC (available from BASF). In some embodiments, the adsorbent layer 110 comprises a high-silica zeolite adsorbent, such as beta zeolite, ZSM-5, Y zeolite, or combinations thereof. As used herein, "high-silica zeolite" refers to a material having a silica-to-alumina ratio, on a molar basis, of at least 5, of at least 10, of at least 20, at least 30, at least 50, at least 100, at least 150, at least 200, at least 250, at least 300, at least 350, at least 400, at least 450, or at least 500. In some embodiments, the silica to alumina ratio is in the range of from 20 to 500.

Figure 1B:
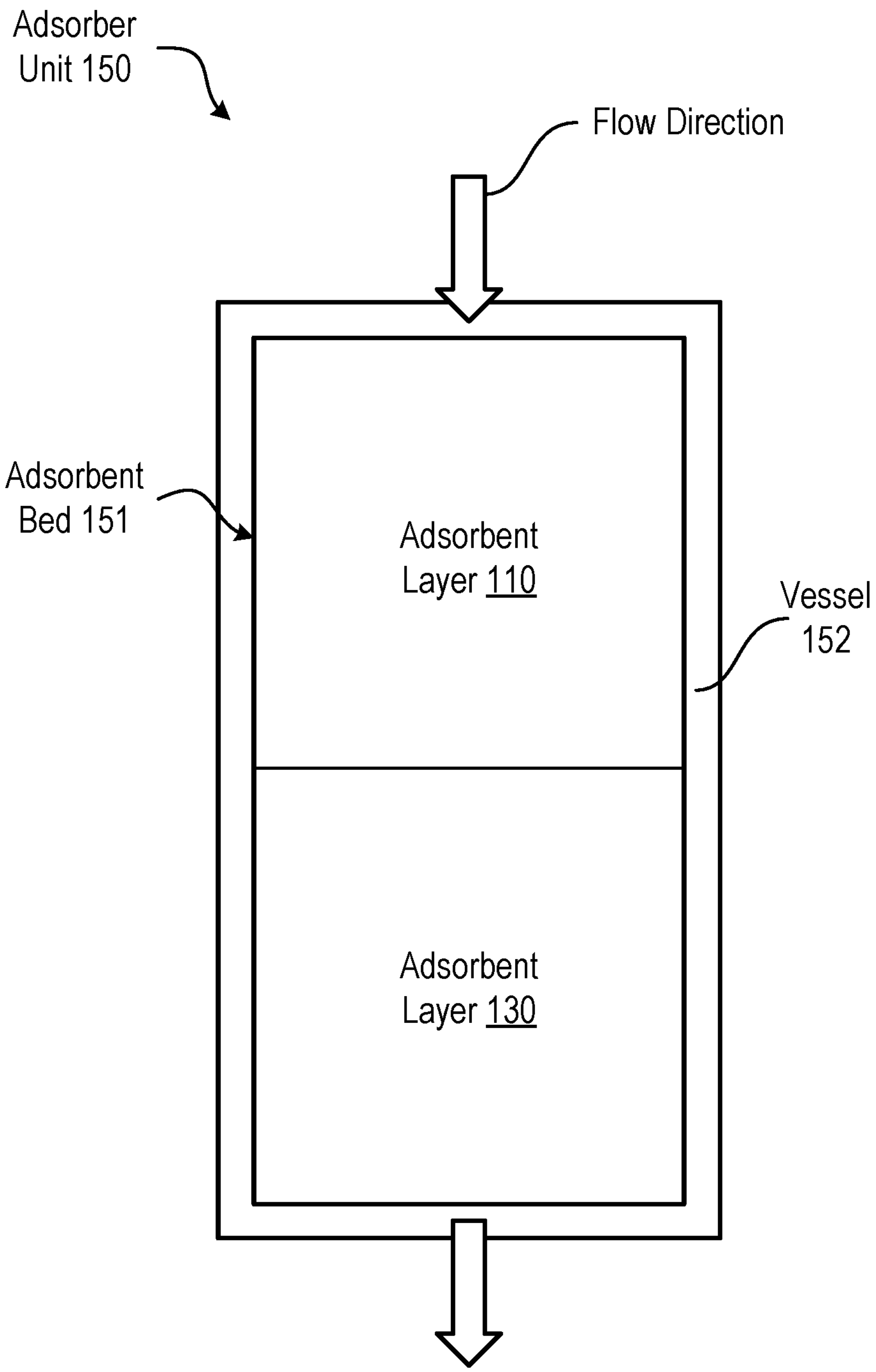
FIG. 1B illustrates a variation of the configuration of FIG. 1A in accordance with a further embodiment of the disclosure.

FIG. 1B illustrates an adsorber unit 150 that is a variant of the adsorber unit 100, having an adsorbent bed 151 in a vessel 152 where the adsorbent layer 120 is replaced with an adsorbent layer 130. In some embodiments, the adsorbent layer 130 comprises a microporous adsorbent. As used herein, the term "microporous adsorbent" refers to an adsorbent material having a relative micropore surface area (RMA), which is the ratio of micropore surface area to Brunauer-Emmett-Teller (BET) surface area, that is at least about 5%, at least about 10%, at least about 15%, at least about 20%, at least about 25%, or at least about 30%. A microporous adsorbent may further have one or more of: a total pore volume for pores between 500 nm and 20000 nm in diameter, as measured via mercury porosimetry, that is at least about 5 $mm^3$/g, at least about 10 $mm^3$/g, at least about 20 $mm^3$/g, at least about 30 $mm^3$/g, at least about 40 $mm^3$/g, at least about 45 $mm^3$/g, or at least about 50 $mm^3$/g; a pore volume (e.g., Barrett-Joyner-Halenda (BJH) pore volume) that is at least about 0.40 $cm^3$/g, is from about 0.40 $cm^3$/g to about 0.50 $cm^3$/g, or from about 0.425 $cm^3$/g to about 0.475 $cm^3$/g; or a BET surface area at least about 400 $m^2$/g, at least about 500 $m^2$/g, at least about 600 $m^2$/g, at least about 700 $m^2$/g, at least about 800 $m^2$/g, or at least about 900 $m^2$/g. Micropore surface area and BET surface area can be characterized via nitrogen porosimetry using, for example, a Micromeritics ASAP® 2000 porosimetry system. Mercury porosimetry can be performed using, for example, a Thermo Scientific Pascal 140/240 porosimeter.

As used herein, "micropore surface area" refers to total surface area associated with pores below 200 angstroms in diameter. In some embodiments, a micropore surface area of the microporous adsorbent is at least about 40 $m^2$/g, at least about 50 $m^2$/g, at least about 100 $m^2$/g, at least about 150 $m^2$/g, at least about 200 $m^2$/g, or at least about 230 $m^2$/g. In some embodiments, the micropore surface area of the microporous adsorbent is from about 40 $m^2$/g to about 300 $m^2$/g, from about 50 $m^2$/g to about 300 $m^2$/g, from about 100 $m^2$/g to about 300 $m^2$/g, from about 150 $m^2$/g to about 300 $m^2$/g, from about 200 $m^2$/g to about 300 $m^2$/g, or from about 230 $m^2$/g to about 300 $m^2$/g. In some embodiments, a relative micropore surface area is from about 5% to about 10%, about 10% to about 15%, about 15% to about 20%, about 20% to about 25%, about 25% to about 30%, or in any range defined therebetween (e.g., about 15% to about 25%). In some embodiments, a corresponding BET surface area of the microporous adsorbent ranges from about 650 $m^2$/to about 850 $m^2$/g.

In some embodiments, the microporous adsorbent comprises amorphous $SiO_2$ at a weight percent at least about 85%, at least about 90%, at least about 95%, at least about 96%, at least about 97%, at least about 98%, or at least about 99%. In some embodiments, the microporous adsorbent further comprises $Al_2O_3$ at a weight percent of up to 20% (i.e., from greater than about 0% to about 20%), up to about 15%, up to about 10%, up to about 9%, up to about 8%, up to about 7%, up to about 6%, up to about 5%, up to about 4%, up to about 3%, up to about 2%, or up to about 1%.

In some embodiments, the total pore volume for pores between 500 nm and 20000 nm in diameter of the microporous adsorbent is at least about 20 $mm^3$/g, at least about 40 $mm^3$/g, at least about 70 $mm^3$/g, at least about 100 $mm^3$/g, at least about 120 $mm^3$/g, at least about 140 $mm^3$/g, at least about 150 $mm^3$/g, at least about 160 $mm^3$/g, or at least about 170 $mm^3$/g. In some embodiments, the total pore volume for pores between 500 nm and 20000 nm in diameter of the microporous adsorbent is from about 20 $mm^3$/g to about 200 $mm^3$/g, from about 40 $mm^3$/g to about 200 $mm^3$/g, from about 70 $mm^3$/g to about 200 $mm^3$/g, from about 100 $mm^3$/g to about 200 $mm^3$/g, from about 120 $mm^3$/g to about 200 $mm^3$/g, from about 140 $mm^3$/g to about 200 $mm^3$/g, from about 150 $mm^3$/g to about 200 $mm^3$/g, from about 160 $mm^3$/g to about 200 $mm^3$/g, from about 170 $mm^3$/g to about 200 $mm^3$/g, or in any range defined therebetween.

In some embodiments, the BET surface area of the microporous adsorbent is from about 400 $m^2$/g to about 1000 $m^2$/g, from about 500 $m^2$/g to about 1000 $m^2$/g, from about 600 $m^2$/g to about 1000 $m^2$/g, from about 700 $m^2$/g to about 1000 $m^2$/g, from about 800 $m^2$/g to about 1000 $m^2$/g, from about 900 $m^2$/g to about 1000 $m^2$/g, or in any range defined therebetween.

In some embodiments, a bulk density of the microporous adsorbent is less than 600 kg/$m^3$. In some embodiments, a bulk density of the microporous adsorbent is at least 600 kg/$m^3$, from about 600 kg/$m^3$ to about 650 kg/$m^3$, about 650 kg/$m^3$ to about 700 kg/$m^3$, from about 700 kg/$m^3$ to about 750 kg/$m^3$, from about 750 kg/$m^3$ to about 800 kg/$m^3$, from about 850 kg/$m^3$ to about 900 kg/$m^3$, from about 950 kg/$m^3$ to about 1000 kg/$m^3$, or in any range defined therebetween.

In some embodiments, the relative sizes of the adsorbent layers 110 and 120 or 130 may be adjusted to remove water such that the treated gas stream is below cryogenic specifications (e.g., a water mole fraction below 1 ppm or below 0.1 ppm).

Figure 2A:
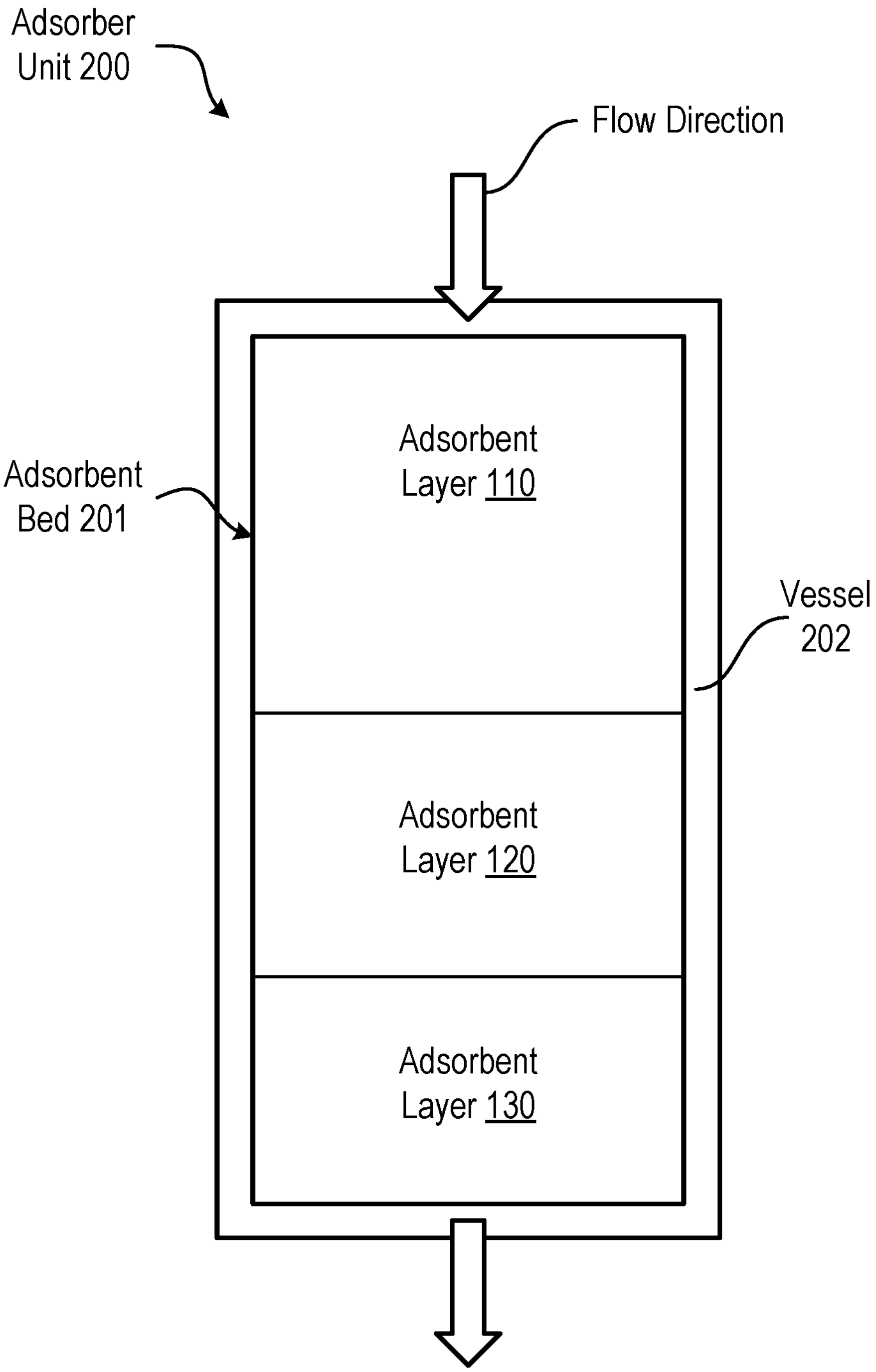
FIG. 2A illustrates an adsorber unit in accordance with a further embodiment of the disclosure.

FIG. 2A illustrates an adsorber unit 200 in accordance with a further embodiment of the disclosure. The adsorber unit 200 comprises the adsorbent layer 110, the adsorbent layer 120, and the adsorbent layer 130 in an adsorbent bed 201 within a vessel 202. Similar to the adsorbent bed 151, in some embodiments, the relative sizes of the adsorbent layers may be adjusted to remove water such that the treated gas stream is below cryogenic specifications (e.g., a water mole fraction below 1 ppm or below 0.1 ppm).

Figure 2B:
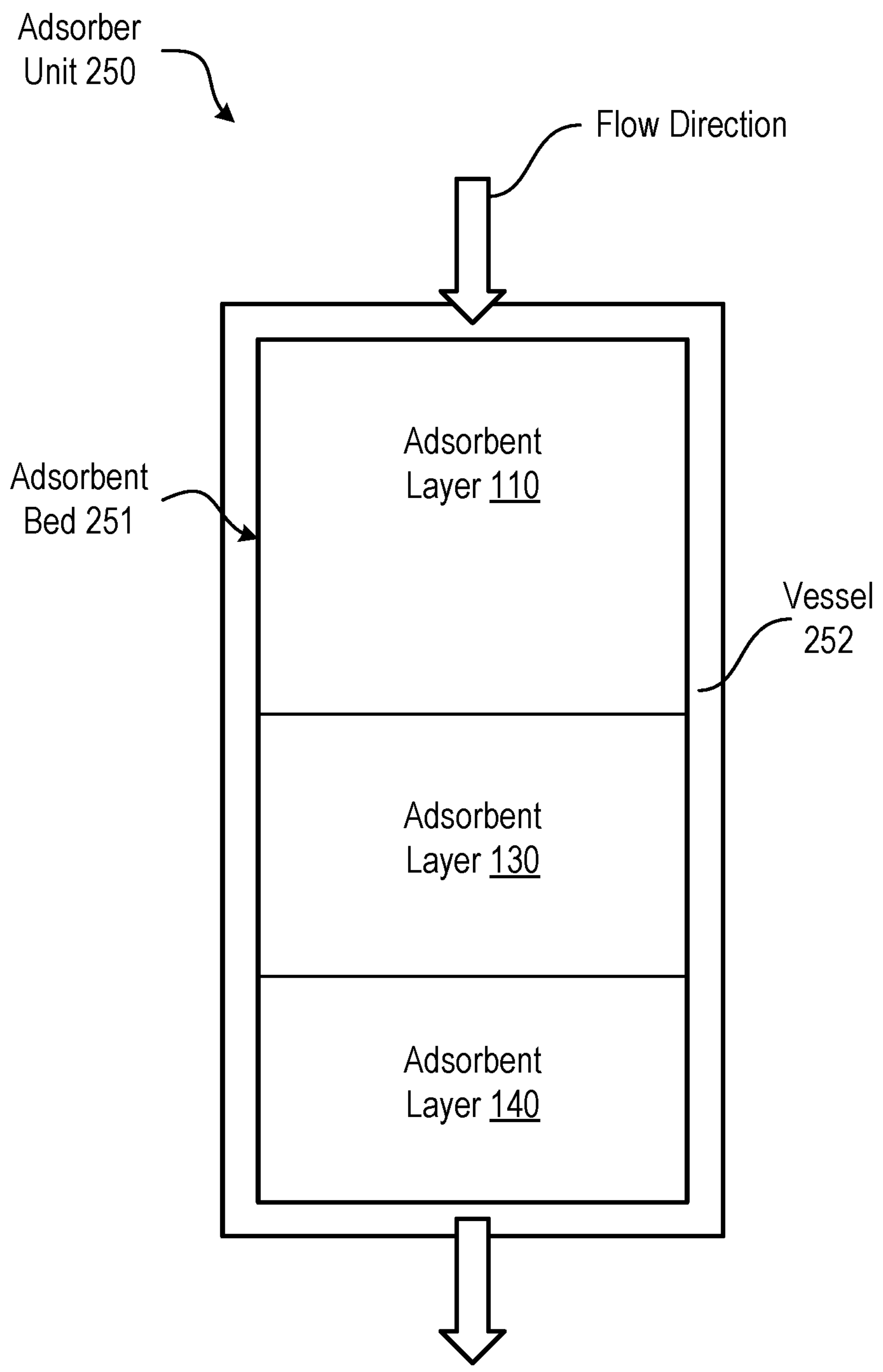
FIG. 2B illustrates a variation of the configuration of FIG. 2A in accordance with a further embodiment of the disclosure.

FIG. 2B illustrates an adsorber unit 250 that is a variant of the adsorber unit 200, where the adsorbent layer 120 in the adsorbent bed 251 within a vessel 252 is removed and an adsorbent layer 140 is inserted downstream from the adsorbent layer 130.

In some embodiments, the adsorbent layer 140 comprises a zeolite, which may be less hydrothermally stable than the other layers in the adsorbent bed 251. In some embodiments, the adsorbent layer 140 comprises one or more of zeolite A, zeolite X (e.g., zeolite 13X, which is zeolite X that has been exchanged with sodium ions), or zeolite Y. An exemplary adsorbent for use in the adsorbent layer 140 may be Durasorb™ HR4 (available from BASF). In some embodiments, the adsorbent layer 140 comprises one or more of zeolite 3A, zeolite 4A, zeolite 5A, or zeolite X. In some embodiments, the zeolite is exchanged with any element of columns I and II of the periodic table, such as Li, Na, K, Mg, Ca, Sr, or Ba. In some embodiments, the adsorbent layer 140 may comprise one or more sub-layers of zeolites, which may be different. For example, an upper sub-layer may comprises zeolite 5A and a lower sub-layer may comprise zeolite 13X, or vice versa. As another example, an upper sub-layer may comprise zeolite 4A and a lower sub-layer may comprise zeolite 5A, or vice versa.

Figure 2C:
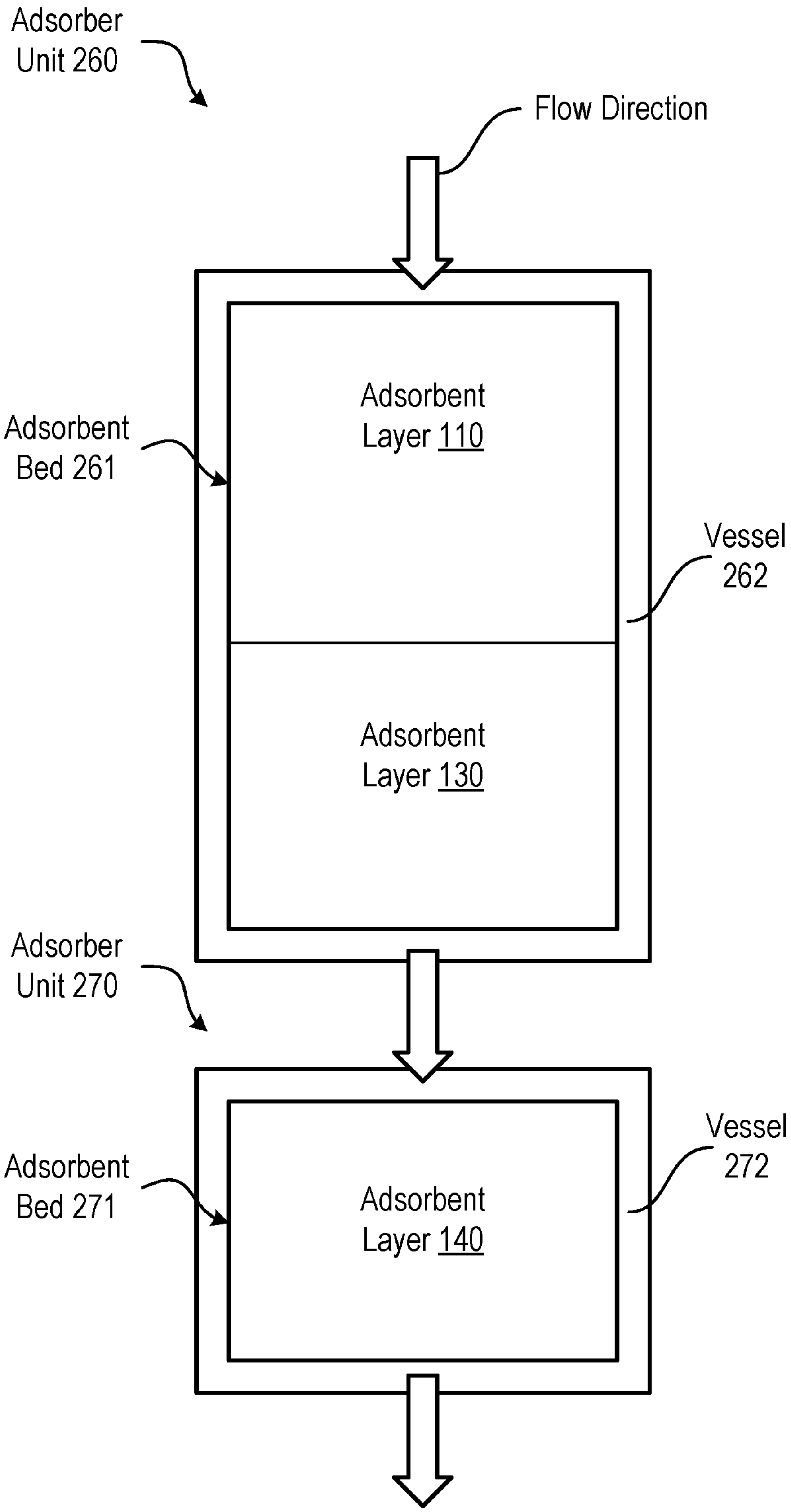
FIG. 2C illustrates a variation of the configuration of FIG. 2B in accordance with a further embodiment of the disclosure.

While it is contemplated that a single adsorber unit may be used with the various embodiments described herein, two or more adsorbent units may be utilized for the various embodiments described herein. FIG. 2C illustrates a variant of FIG. 2B, where separate adsorber units 260 and 270 are used, each having separate vessels 262 and 272, respectively, for housing adsorbent beds 261 and 271, respectively. As shown, the adsorbent layer 110 and the adsorbent layer 130 are contained in the vessel 262 of the adsorber unit 260, and the adsorbent layer 140 is contained within the vessel 272 of the adsorber unit 270, with the adsorber unit 270 being downstream from the adsorber unit 260. In some embodiments, the adsorber unit 260 is utilized for heavy hydrocarbon adsorption removal from the gas feed stream, and the adsorber unit 270 is utilized for dehydration of the gas feed stream and/or removal of methanol. Though FIG. 2C provides a simplified view of the adsorber units 260 and

270, it is to be understood that various other components may be present, including heaters, coolers, various valves and connective elements, and controllers to regulate mass flow to, from, and between the adsorber units 260 and 270. Each adsorber unit 260 and 270 may include duplicate vessels and adsorbent beds used to facilitate the implementation of a continuous TSA process. Moreover, it is further contemplated that a dual- or multi-adsorber unit configuration could be applied to the adsorber units 100, 150, 200, and 250.

Figure 3A:
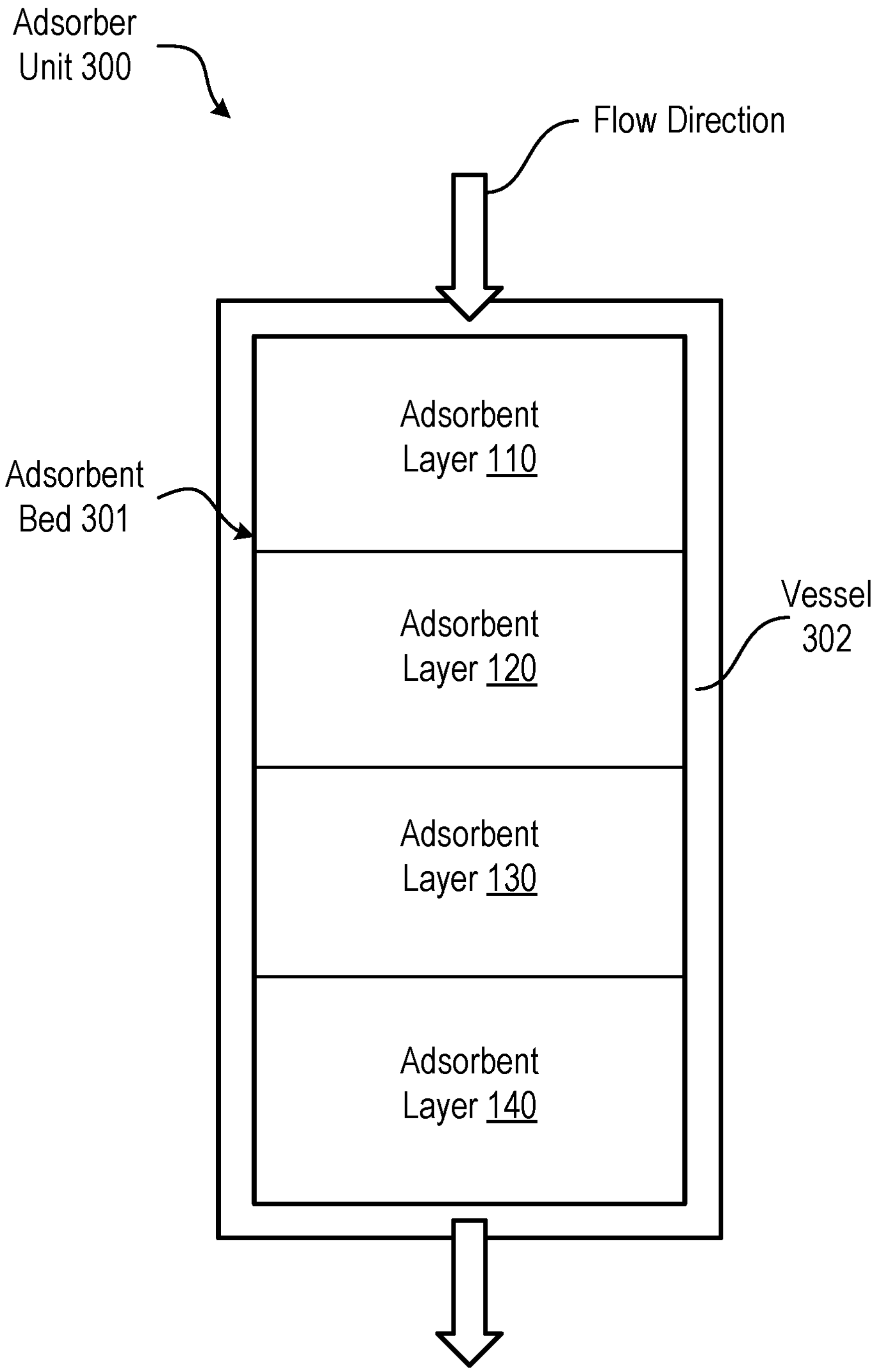
FIG. 3A illustrates an adsorber unit in accordance with a further embodiment of the disclosure.
Figure 3B:
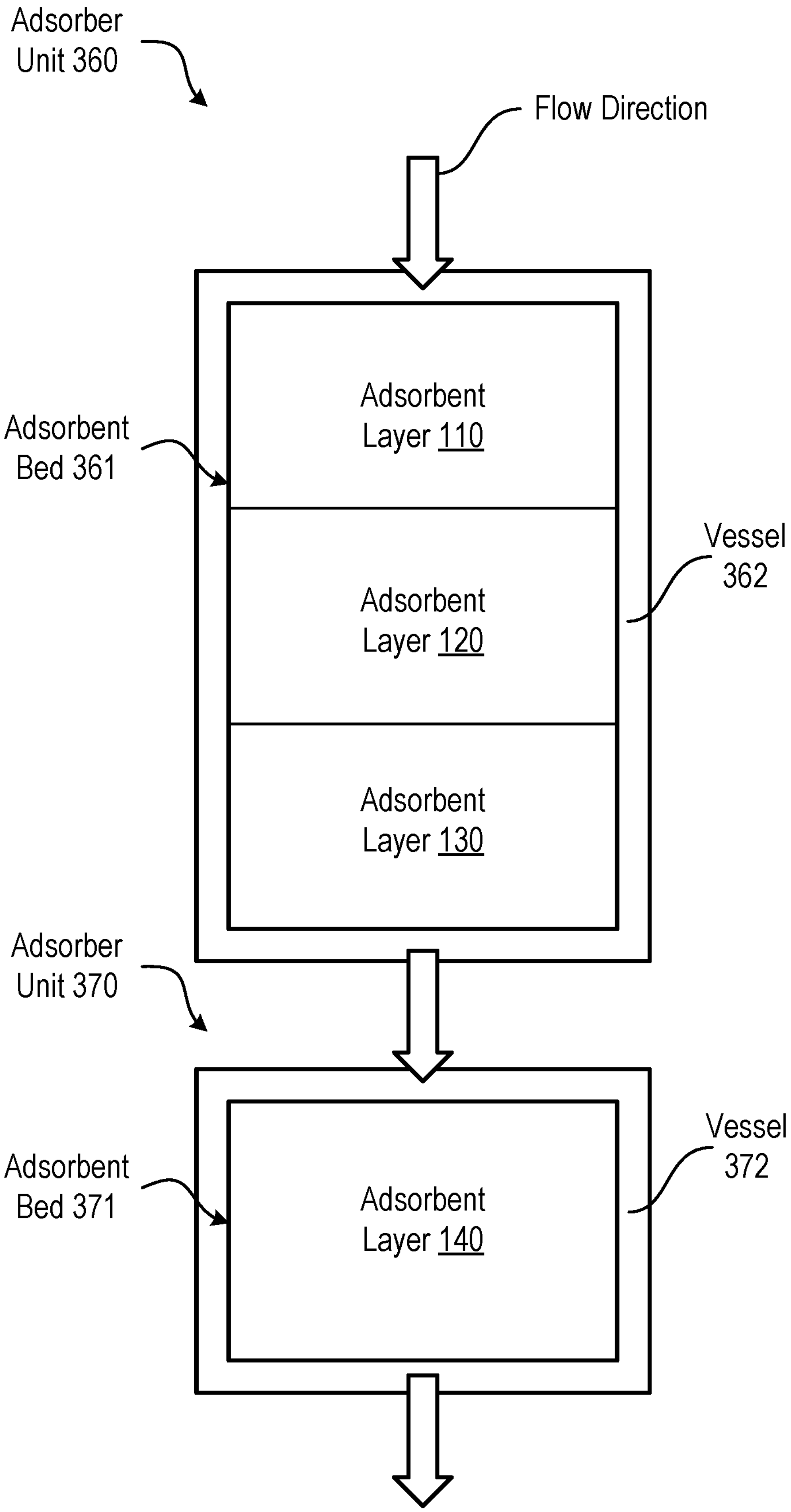
FIG. 3B illustrates a variation of the configuration of FIG. 3A in accordance with a further embodiment of the disclosure.

FIG. 3A illustrates an adsorber unit 300 in accordance with a further embodiment of the disclosure. The adsorber unit 300 is similar to the adsorber unit 250, except that it further includes the adsorbent layer 120 between the adsorbent layers 110 and 130 in the adsorbent bed 301 within a vessel 302. FIG. 3B illustrates adsorber units 360 and 370 that are a variant of the adsorber unit 300, where separate adsorbent beds 361 and 371 are contained in separate vessels 362 and 372, respectively.

It is contemplated that a dual- or multi-unit configuration could be applied to any of the adsorber units 100, 150, 200, 250, 260 and 270, 300, or 360 and 370. In some embodiments, for embodiments for which the adsorbent beds are part of a TSA process, a cycle time may vary for different adsorber units in a multi-unit configuration. For example, with reference to FIG. 1A, the adsorber unit 100 (for which the adsorbent bed 101 may contain, for example, an amorphous silica adsorbent, an amorphous silica-alumina adsorbent, or a high-silica zeolite adsorbent) may be subject to a cycle time of no more than about 8 hours, no more than about 7 hours, no more than about 6 hours, no more than about 5 hours, no more than about 4 hours, no more than about 3 hours, no more than about 2 hours, or no more than about 1 hour. The adsorber unit 260 (for which the adsorbent bed 261 may contain, for example, a microporous adsorbent) may be subject to a cycle time that is longer than that of the adsorber unit 270, such as greater than about 10 hours and up to about 24 hours, up to about 48 hours, or up to about 72 hours. Similar variations in the cycle times may be applied to each of the aforementioned configurations.

Figure 4:
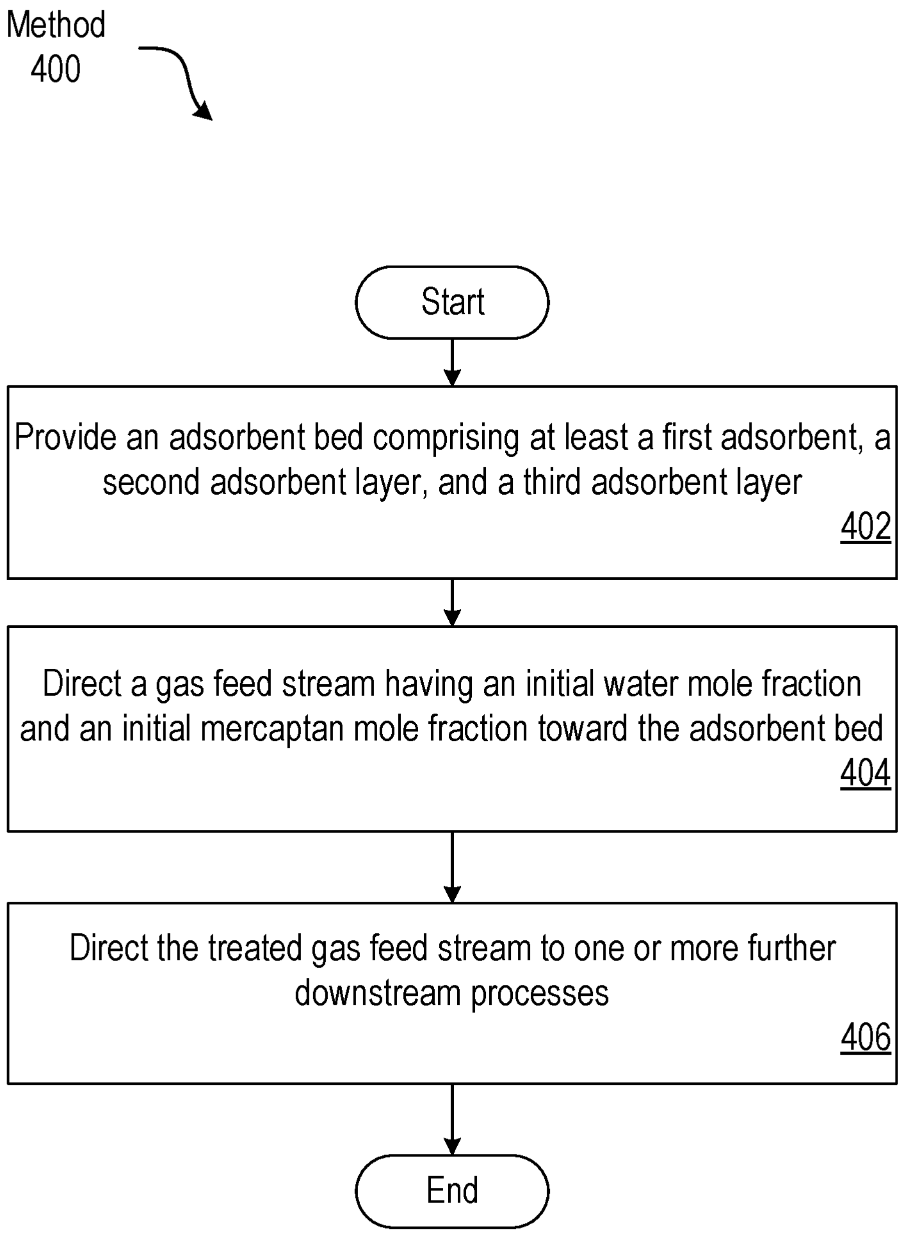
FIG. 4 illustrates a method of treating a gas feed stream in accordance with an embodiment of the disclosure.

FIG. 4 illustrates a method 400 for removing water, mercaptans, heavy hydrocarbons (e.g., C5+ or C6+ hydrocarbons), or any combination thereof from a gas feed stream in accordance with an embodiment of the disclosure. At block 402, one or more adsorbent beds (e.g., any of adsorbent beds 100, 150, 200, 250, 260 and 270, 300, 360 and 370, or modifications thereof) is provided, the adsorbent bed(s) comprising at least a first adsorbent layer (e.g., the adsorbent layer 110), a second adsorbent layer (e.g., the adsorbent layer 120 or the adsorbent layer 130), and a third adsorbent layer (e.g., the adsorbent layer 140 or the adsorbent layer 130). In some embodiments, the adsorbent bed(s) may include additional layers (e.g., the adsorbent bed 300) or utilize one or more vessels for housing one or more adsorbent layers (e.g., the adsorbent beds 360 and 370 contained in the vessels 362 and 372, respectively).

At block 404, a gas feed stream having an initial water mole fraction, an initial mercaptan mole fraction, an initial C5+ or C6+ mole fraction, or any combination thereof is directed toward the adsorbent bed(s). In some embodiments, the gas feed stream comprises a natural gas feed stream. In some embodiments, the contact is performed as part of a TSA process. The TSA process may have an adsorption cycle time of no more than about 8 hours, about 7 hours, about 6 hours, about 5 hours, about 4 hours, about 3 hours, about 2 hours, or about 1 hour.

The gas feed stream may have an initial water mole fraction, an initial mercaptan mole fraction, an initial C5+ or C6+ hydrocarbon mole fraction, or any combination thereof prior to entering the adsorbent bed(s) and contacting the first adsorbent layer. After passing through the first adsorbent layer (e.g., a water stable adsorbent) and/or the second adsorbent layer (e.g., a microporous adsorbent), the gas feed stream has a reduced water mole fraction, reduced mercaptan mole fraction, reduced C5+ or C6+(e.g., aromatics or aliphatic C8+ or C9+) hydrocarbon mole fraction, or any combination thereof compared to a respective initial water mole fraction, initial mercaptan mole fraction, or C5+ or C6+ hydrocarbon mole fraction when the gas feed stream reaches the third adsorbent layer (which is particularly advantageous when the third adsorbent layer comprises a zeolite). In some embodiments, block 404 corresponds to an adsorption step in an adsorption cycle in a TSA process. In some embodiments, the reduced water mole fraction is maintained for at least 90% of the duration of the adsorption step. That is, the third adsorbent layer, which may be less hydrothermally stable than the first adsorbent layer, is contacted with less water than the first adsorbent layer and/or the second adsorbent layer, which increases the overall lifetime of the third adsorbent layer over several TSA cycles. In some embodiments, the reduced water mole fraction, mercaptan mole fraction, or C5+ or C6+ hydrocarbon mole fraction, or any combination thereof prior to reaching the third adsorbent layer is maintained for at least 95%, at least 96%, at least 97%, at least 98%, at least 99%, or 100% of the duration of the adsorption step.

In some embodiments, the reduced water mole fraction is no more than about 90% of the initial water mole fraction. In some embodiments, the reduced water mole fraction is no more than about 80%, no more than about 70%, no more than about 60%, no more than about 50%, no more than about 40%, no more than about 30%, no more than about 20%, no more than about 10%, no more than about 9%, no more than about 8%, no more than about 7%, no more than about 6%, no more than about 5%, no more than about 4%, no more than about 3%, no more than about 2%, no more than about 1%, no more than about 0.1%, no more than about 0.01%, or no more than about 0.001% of the initial water mole fraction. In some embodiments, the reduced water mole fraction is no more than about 20% of the initial water mole fraction. In some embodiments, the reduced water mole fraction is no more than about 500 ppm, no more than about 450 ppm, no more than about 400 ppm, no more than about 350 ppm, no more than about 300 ppm, no more than about 250 ppm, no more than about 200 ppm, no more than about 150 ppm, no more than about 100 ppm, no more than about 50 ppm, no more than about 40 ppm, no more than about 30 ppm, no more than about 20 ppm, no more than about 10 ppm, or no more than about 5 ppm. In other embodiments, the reduced water mole fraction is no more than about 100 ppm, no more than about 50 ppm, no more than about 10 ppm, no more than about 9 ppm, no more than about 8 ppm, no more than about 7 ppm, no more than about 6 ppm, no more than about 5 ppm, no more than about 4 ppm, no more than about 3 ppm, no more than about 2 ppm, or no more than about 1 ppm.

In some embodiments, the reduced mercaptan mole fraction is no more than about 90% of the initial mercaptan mole fraction. In some embodiments, the reduced mercaptan mole fraction is no more than about 80%, no more than about 70%, no more than about 60%, no more than about 50%, no more than about 40%, no more than about 30%, no more than about 20%, no more than about 10%, no more than about 9%, no more than about 8%, no more than about 7%, no more than about 6%, no more than about 5%, no more than about 4%, no more than about 3%, no more than about 2%, no more than about 1%, no more than about 0.1%, no more than about 0.01%, or no more than about 0.001% of the initial mercaptan mole fraction. In some embodiments, the reduced mercaptan mole fraction is no more than about 500 ppm, no more than about 450 ppm, no more than about 400 ppm, no more than about 350 ppm, no more than about 300 ppm, no more than about 250 ppm, no more than about 200 ppm, no more than about 150 ppm, no more than about 100 ppm, no more than about 50 ppm, no more than about 40 ppm, no more than about 30 ppm, no more than about 20 ppm, no more than about 10 ppm, no more than about 5 ppm, or no more than about 1 ppm.

In some embodiments, the C5+ or C6+ hydrocarbons may comprise one or more of pentane, hexane, benzene, heptane, octane, nonane, toluene, ethylbenzene, xylene, or neopentane. In some embodiments, a reduced mole fraction of aromatics (e.g., one or more of benzene, toluene, xylene, or other aromatic compounds) or aliphatic C8+ or C9+ hydrocarbons prior to reaching the third adsorbent layer is less than or equal to 90% of an initial mole fraction. In some embodiments, the reduced mole fraction of aromatics or aliphatic C8+ or C9+ hydrocarbons is no more than about 80%, no more than about 70%, no more than about 60%, no more than about 50%, no more than about 40%, no more than about 30%, no more than about 20%, no more than about 10%, no more than about 9%, no more than about 8%, no more than about 7%, no more than about 6%, no more than about 5%, no more than about 4%, no more than about 3%, no more than about 2%, no more than about 1%, no more than about 0.1%, no more than about 0.01%, or no more than about 0.001% of the initial mole fraction. In some embodiments, the reduced mole fraction of aromatics or aliphatic C8+ or C9+ hydrocarbons is no more than about 500 ppm, no more than about 450 ppm, no more than about 400 ppm, no more than about 350 ppm, no more than about 300 ppm, no more than about 250 ppm, no more than about 200 ppm, no more than about 150 ppm, no more than about 100 ppm, no more than about 50 ppm, no more than about 40 ppm, no more than about 30 ppm, no more than about 20 ppm, no more than about 10 ppm, no more than about 5 ppm, or no more than about 1 ppm.

In some embodiments, one or more non-mercaptan hydrocarbons in the gas feed stream is reduced by 100%, 90%, 80%, 70%, 60%, 50%, 40%, 30%, 20%, 10%, or 5% on a molar basis relative to an initial concentration of that component in the gas feed stream. In at least one embodiment, the one or more components are selected from benzene, C9 hydrocarbons, C8 hydrocarbons, C7 hydrocarbons, C6 hydrocarbons, or C5 hydrocarbons. That is, for a given component in the gas feed stream (e.g., benzene), a concentration of the component in the gas feed stream after passing through the adsorbent bed(s) will be reduced by a specific amount on a molar basis relative to the initial concentration.

At block 406, the treated gas feed stream is directed to one or more further downstream processes, such as additional adsorption steps. In some embodiments, a downstream process may be forming a liquefied natural gas product from the gas feed stream if the treated gas feed stream meets cryogenic specifications. For example, final water mole fraction of the gas feed stream after contacting the second adsorbent layer may be below 1 ppm or below 0.1 ppm. In some embodiments, a final mercaptans mole fraction of the gas feed stream after contacting the second adsorbent layer may be below 10 ppm or below 1 ppm. In some embodiments, the downstream process may be forming a C2+ or C3+ natural gas liquid feed stream from the gas feed stream.

In some embodiments, during regeneration of the adsorbent bed(s), a product gas stream/treated gas feed stream may be used to heat and cool the adsorbent bed(s). In some embodiments, during regeneration of the adsorbent bed(s), the gas feed stream may be used to cool the adsorbent bed(s) and a product gas stream/treated gas feed stream may be used to heat the adsorbent bed(s).

In some embodiments, the adsorbent bed(s) may be retrofitted or refilled by removing and replacing at least a portion of a previously present adsorbent with one or more of the first adsorbent layer or the second adsorbent layer. Retrofitting can include installing internal insulation into the vessel (e.g., the vessel 102), changing adsorption time, changing heating time, changing cooling time, changing regeneration gas flow rate, and changing regeneration gas temperature. In some embodiments, a zeolite material that has been hydrothermally damaged may be replaced with a zeolite adsorbent (e.g., the adsorbent layer 140) that has not been hydrothermally damaged or still has sufficient adsorption capacity.

ILLUSTRATIVE EXAMPLES

The following examples are set forth to assist in understanding the disclosure and should not, of course, be construed as specifically limiting the embodiments described and claimed herein. Such variations of the disclosed embodiments, including the substitution of all equivalents now known or later developed, which would be within the purview of those skilled in the art, and changes in formulation or minor changes in experimental design, are to be considered to fall within the scope of the embodiments incorporated herein.

Example 1

Figure 5:
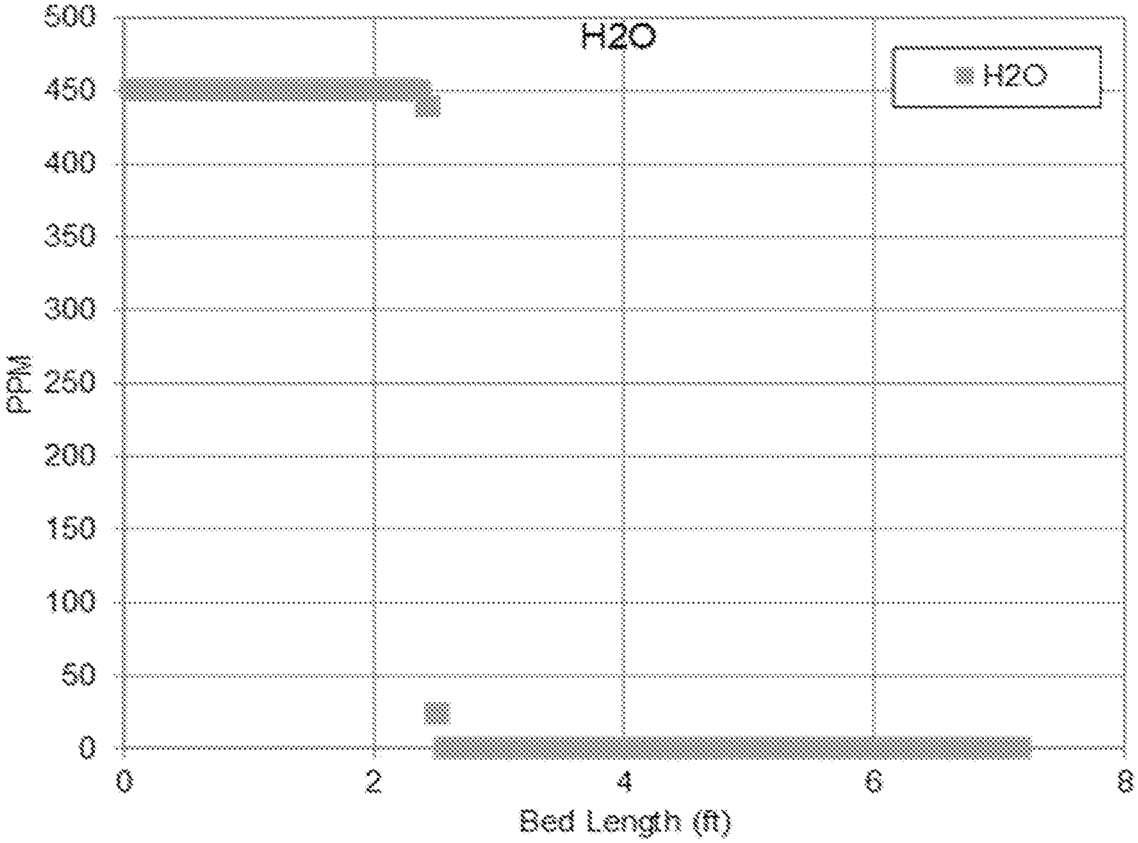
FIG. 5 shows a simulated $H_2O$ profile of a zeolite 4A bed at the end of adsorption.

A bed of zeolite 4A was simulated with a feed of 450 ppm of water. The bed contained 30000 kg of zeolite with a volume of 43 $m^3$. The bed was operated at a temperature of 25° C. and a pressure of 62 bara. A flow rate of 176000 $Nm^3/hr$ (normal meters cubed per hour) was simulated. FIG. 5 shows an $H_2O$ profile of a zeolite 4A bed at the end of adsorption.

Example 2

Figure 6:
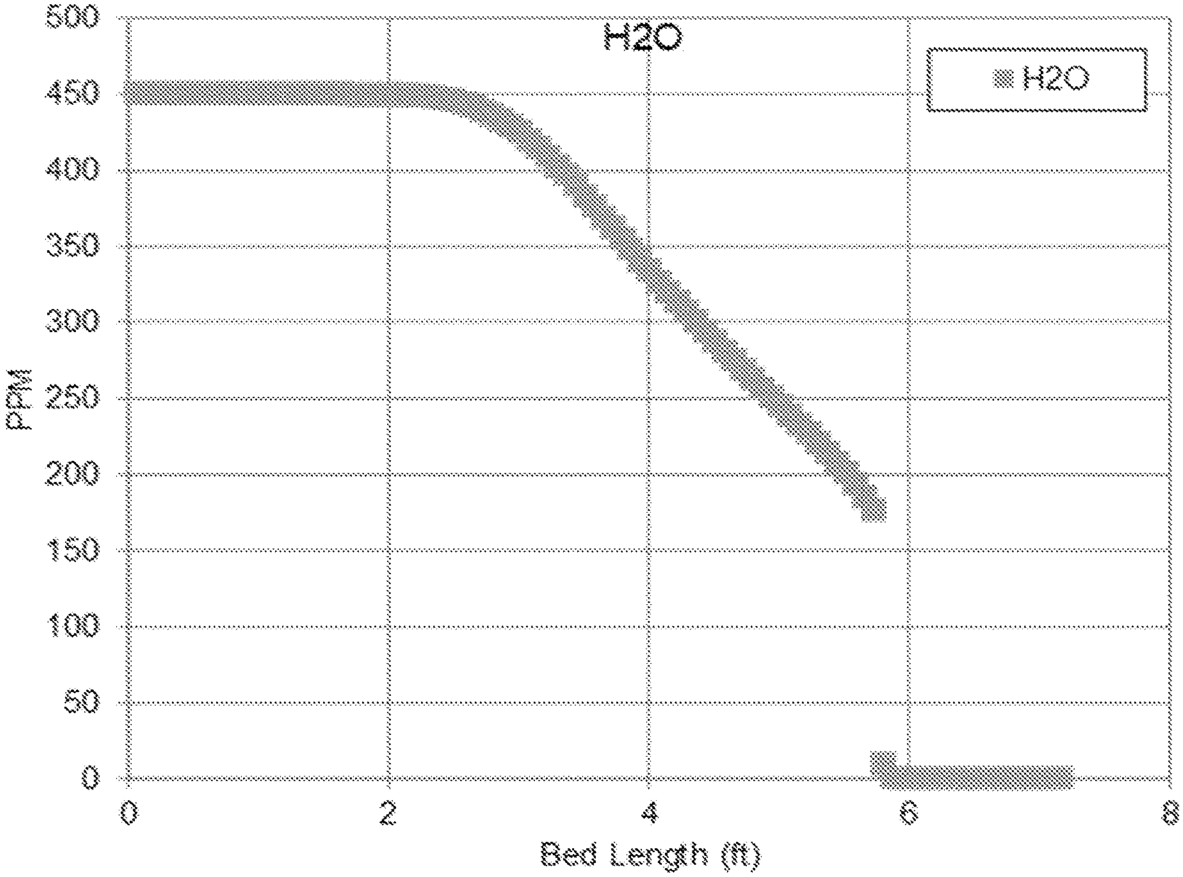
FIG. 6 shows a simulated $H_2O$ profile of a Durasorb™ HD and zeolite 4A bed at the end of adsorption.

A bed of Durasorb™ HD 24000 kg and zeolite 4A was simulated with a feed of 450 ppm of water. The bed contained 6000 kg of zeolite with a volume of 43 $m^3$. The bed was operated at a temperature of 25° C. and a pressure of 62 bara. A flow rate of 176000 $Nm^3/hr$ was simulated. FIG. 6 shows an $H_2O$ profile of the Durasorb™ HD and zeolite 4A sieve bed at the end of adsorption.

Examples 3-6

The following examples illustrate that if the water content to the zeolite 4A layer is reduced, the amount of water at elevated temperatures during regeneration of the bed can be reduced, which in turn will reduce the degree of hydrothermal damage.

The same volume (43 $m^3$) of adsorbent zeolite 4A was simulated for the remaining examples. A feed at 25° C. and 62 bar was fed to the bed. All beds were allowed to run such that the entire bed was saturated at the feed conditions. For example, in example 3, at the end of adsorption 450 ppm of water was leaving the bed. Similarly, in example 6, 10 ppm of water was leaving the bed on adsorption. All beds were regenerated with 14500 $Nm^3$/hr of gas at 295° C.

Figure 7:
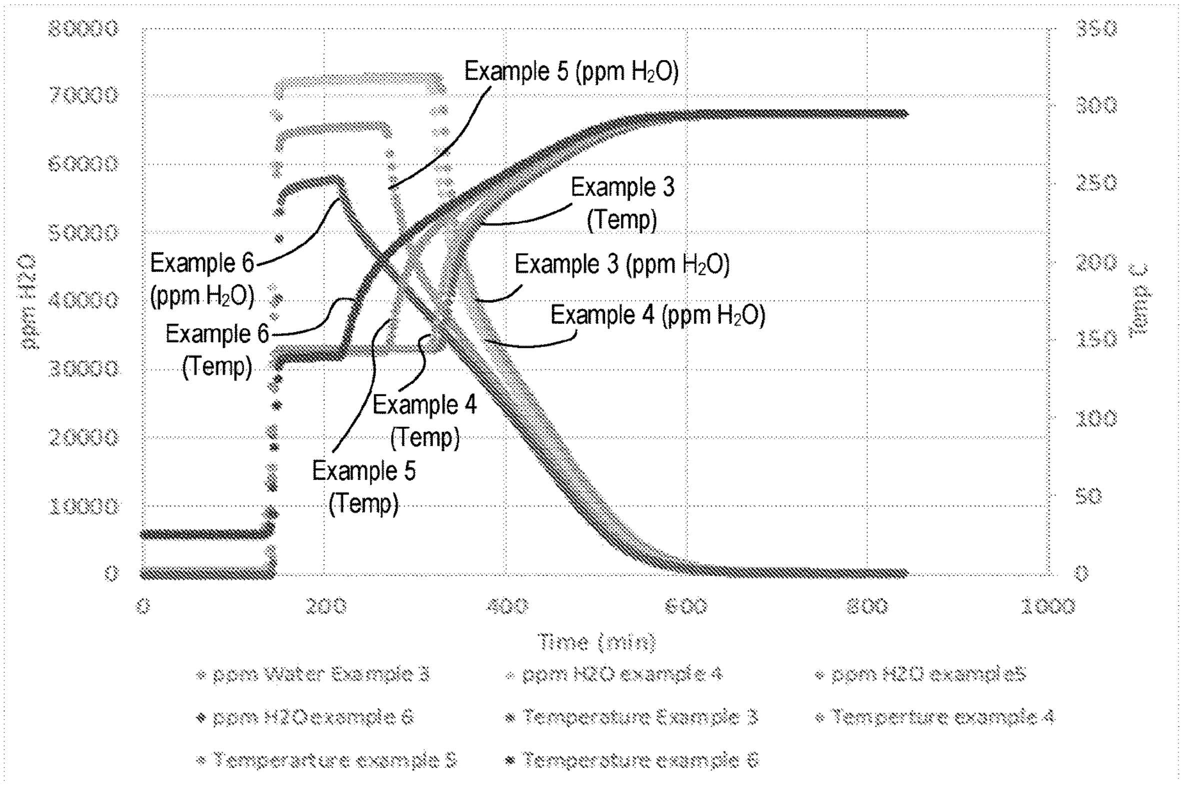
FIG. 7 shows outlet composition and temperature for various simulated adsorbent beds.

FIG. 7 shows the simulated outlet composition and temperature for each of Example 3 (feed of 450 ppm water), Example 4 (feed of 180 ppm water), Example 5 (feed of 10 ppm water), and Example 6 (feed of 5 ppm water). As clearly illustrated, the combination of water concentration, temperature, and time was reduced as the amount of water in the feed to the zeolite section was reduced. For example, the 5 ppm water feed is at its maximum water concentration for approximately 70 minutes whereas the 450 ppm water feed is at the maximum water concentration for 170 minutes. Not illustrated but implicit is that as the zeolite fraction of the bed is reduced at the time the zeolite will be at high concentration water and temperature will be reduced for a fixed regeneration flow. Consequently, examples 3-6 represent a worst case scenario such that if the zeolite was only 20% of the beds in those cases, the time scale they would be exposed to elevated water would have been reduced further by a factor of 5, thereby reducing the degree of hydrothermal damage even further for all cases.

Example 7

By analogy to Example 2, a bed of Durasorb™ HD followed by zeolite 13X is contemplated. The Durasorb™ HD bed is sized to remove the bulk of the mercaptans thereby reducing the amount of mercaptans entering the zeolite 13X section of the bed. By lowering the mercaptan level entering the zeolite 13X section, the rate of deactivation of the zeolite 13X section will be reduced, as described by A. F. Carlsson T. Last, J. B. Rajani, "How to Avoid Excessive Mol Sieve Deactivation when used for Mercaptan Removal," 84th Annual GPA Convention, 2005. The rate of deactivation is further reduced because lowering the amount of mercaptans that are adsorbed also lowers the concentration on desorption, further lowering the deactivation rate.

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number±10%, such that "about 10" would include from 9 to 11.

Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment, and such references mean "at least one".

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method of removing C5+ or C6+ hydrocarbons from a gas feed stream during an adsorption step of an adsorption cycle, wherein the C5+ or C6+ compounds comprise one or more of pentane, hexane, benzene, heptane, octane, nonane, toluene, ethylbenzene, xylene, or neopentane, and wherein the method comprises:

directing the gas feed stream having an initial mole fraction of the C5+ or C6+ hydrocarbons toward one or more adsorbent beds of one or more adsorber units, the one or more adsorbent beds comprising:

a first adsorbent layer to remove C5+ or C6+ hydrocarbons from the gas feed stream, the first adsorbent layer comprising a water stable adsorbent, wherein the water stable adsorbent comprises an amorphous silica adsorbent or an amorphous silica-alumina adsorbent;

a second adsorbent layer downstream from the first adsorbent layer to remove additional C5+ or C6+ hydrocarbons, the second adsorbent layer comprising a microporous adsorbent, wherein the microporous adsorbent comprises amorphous $SiO_2$ and optionally further comprises $Al_2O_3$; and a third adsorbent layer downstream from the second adsorbent layer, the third adsorbent layer comprising one or more zeolites or an additional microporous adsorbent;

wherein the gas feed stream has a reduced mole fraction of aromatics and/or aliphatic C8+ or C9+ hydrocarbons when the gas feed stream reaches the third adsorbent layer that is maintained for at least 90% of the duration of the adsorption step, and wherein the reduced mole fraction is no more than about 90% of the initial mole fraction.

2. The method of claim 1, wherein the reduced mole fraction of aromatics and/or aliphatic C8+ or C9+ hydrocarbons when the gas feed stream reaches the third adsorbent layer is no more than about 80% of the initial mole fraction.

3. The method of claim 1, wherein the reduced mole fraction prior to reaching the third adsorbent layer that is no more than about 500 ppm.

4. The method of claim 1, wherein the one or more adsorbent beds further comprise:

a fourth adsorbent layer downstream from the first adsorbent layer and upstream from the second adsorbent layer, wherein the fourth adsorbent layer comprising one or more of an amorphous silica adsorbent, an amorphous silica-alumina adsorbent, or a high-silica zeolite adsorbent.

5. The method of any of claim 4, wherein the fourth third adsorbent layer comprises the high-silica zeolite adsorbent.

6. The method of claim 5, wherein the high-silica zeolite adsorbent comprises ZSM-5, zeolite Y, or beta zeolite.

7. The method of claim 1, wherein the third adsorbent layer comprises the one or more zeolites, and the one or more zeolites comprise one or more of zeolite 3A, zeolite 4A, or zeolite 5A.

8. The method of claim 1, wherein the third adsorbent layer comprises the one or more zeolites, and the one or more zeolites comprise one or more of zeolite 5A or zeolite X.

9. The method of claim 1, wherein the third adsorbent layer comprises the one or more zeolites, and the one or more zeolites comprise zeolite 13X.

10. The method of claim 1, wherein the third adsorbent layer comprises the one or more zeolites, and the one or more zeolites comprise zeolite 4A.

11. The method of claim 1, wherein the microporous adsorbent exhibits a ratio of its micropore surface area to its BET surface area of at least about 5%.

12. The method of claim 11, wherein the microporous adsorbent exhibits a ratio of its micropore surface area to its BET surface area of from about 5% to about 30%.

13. The method of claim 1, wherein the microporous adsorbent comprises amorphous $SiO_2$ at a weight percent at least about 95%.

14. A method of removing C5+ or C6+ hydrocarbons from a gas feed stream during an adsorption step of an adsorption cycle, wherein the C5+ or C6+ compounds comprise one or more of pentane, hexane, benzene, heptane, octane, nonane, toluene, ethylbenzene, xylene, or neopentane, and wherein the method comprises:

directing the gas feed stream having an initial mole fraction of the C5+ or C6+ hydrocarbons toward one or more adsorbent beds of one or more adsorber units, the one or more adsorbent beds comprising:

a first adsorbent layer to remove C5+ or C6+ hydrocarbons from the gas feed stream, the first adsorbent layer comprising a water stable adsorbent, wherein the water stable adsorbent comprises an amorphous silica adsorbent or an amorphous silica-alumina adsorbent;

a second adsorbent layer downstream from the first adsorbent layer to remove additional C5+ or C6+ hydrocarbons, the second adsorbent layer comprising a microporous adsorbent, wherein the microporous adsorbent comprises amorphous $SiO_2$ and optionally further comprises $Al_2O_3$ and wherein the microporous adsorbent comprises amorphous $SiO_2$ at a weight percent at least about 85%; and a third adsorbent layer downstream from the second adsorbent layer, the third adsorbent layer comprising one or more zeolites or an additional microporous adsorbent;

wherein the gas feed stream has a reduced mole fraction of aromatics and/or aliphatic C8+ or C9+ hydrocarbons when the gas feed stream reaches the third adsorbent layer that is maintained for at least 90% of the duration of the adsorption step, and wherein the reduced mole fraction is no more than about 90% of the initial mole fraction.

* * * * *